United States Patent
Aboul-Magd et al.

(10) Patent No.: US 9,503,911 B2
(45) Date of Patent: Nov. 22, 2016

(54) SYSTEM AND METHOD FOR COORDINATED BEAMFORMING FOR OVERLAPPING BASIC SERVICE SET IN WLAN

(71) Applicant: Huawei Technologies Co., Ltd., Shenzhen (CN)

(72) Inventors: Osama Aboul-Magd, Kanata (CA); Jung Hoon Suh, Kanata (CA); Kwok Shum Au, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 168 days.

(21) Appl. No.: 14/340,175

(22) Filed: Jul. 24, 2014

(65) Prior Publication Data

US 2016/0029227 A1    Jan. 28, 2016

(51) Int. Cl.
*H04W 4/00* (2009.01)
*H04W 16/28* (2009.01)
(Continued)

(52) U.S. Cl.
CPC ............ *H04W 16/28* (2013.01); *H04L 5/0053* (2013.01); *H04W 84/12* (2013.01); *H04W 88/08* (2013.01); *H04W 92/20* (2013.01)

(58) Field of Classification Search
CPC ... H04W 16/28; H04W 84/12; H04W 88/08; H04W 92/20; H04L 5/0053
USPC ........................................................ 370/329
See application file for complete search history.

(56) References Cited

U.S. PATENT DOCUMENTS

2008/0192715 A1    8/2008  Sekhar
2008/0225770 A1    9/2008  Cho et al.
(Continued)

FOREIGN PATENT DOCUMENTS

CN    102857277 A      1/2013
WO    2011074761 A1    6/2011
(Continued)

OTHER PUBLICATIONS

IEEE Std. 802.11ac-2013 "Part 11: Wireless LAN Medium Access Control (MAC) and Physical Layer (PHY) Specifications Amendment 4: Enhancements for Very High Throughput for Operation in Bands below 6 GHz" IEEE Standard for Information Technology—Telecommunications and information exchange between systems Local and metropolitan area networks—Specific requirements, Dec. 11, 2013, pp. 1-425.

(Continued)

*Primary Examiner* — Faisal Choudhury
(74) *Attorney, Agent, or Firm* — Slater Matsil, LLP (57) ABSTRACT

Embodiments are provided for enabling a coordinated beamforming (CB) mechanism in WLAN scenarios. In an embodiment, an AP sends a Feedback Request (FBR) frame to each one of the STAs in the OBSSs. The OBSSs comprise the STAs and a plurality of APs including the AP. The AP then receives a feedback frame from each STA of the STAs that participate in the CB transmission. The feedback frame includes channel state information (CSI) of the STA. The CSI enables the sending AP of performing CB on downlink. In an embodiment, the AP receives an initiate CB frame from a second AP initiating a CB transmission, and then sends an ACK frame to the second AP before sending the FBR frame to each one of the STAs. The AP starts the CB transmission with each one of the other APs that participate in the CB transmission.

22 Claims, 6 Drawing Sheets

(51) Int. Cl.
*H04L 5/00* (2006.01)
*H04W 84/12* (2009.01)
*H04W 88/08* (2009.01)
*H04W 92/20* (2009.01)

(56) References Cited

U.S. PATENT DOCUMENTS

| | | | |
|---|---|---|---|
| 2011/0051647 A1* | 3/2011 | Sampath | H04L 1/0003 370/312 |
| 2012/0122507 A1 | 5/2012 | Gao et al. | |
| 2012/0163332 A1 | 6/2012 | Venturino et al. | |
| 2012/0176921 A1* | 7/2012 | Abraham | H04L 1/0026 370/252 |
| 2012/0189077 A1* | 7/2012 | Seo | H04B 7/024 375/267 |
| 2012/0257574 A1 | 10/2012 | Seok et al. | |
| 2013/0157712 A1 | 6/2013 | Park et al. | |
| 2013/0242940 A1 | 9/2013 | Jones et al. | |
| 2013/0286959 A1* | 10/2013 | Lou | H04W 72/04 370/329 |
| 2013/0316705 A1 | 11/2013 | Kneckt et al. | |
| 2014/0056204 A1 | 2/2014 | Suh et al. | |
| 2014/0064261 A1 | 3/2014 | Wang et al. | |
| 2014/0080420 A1* | 3/2014 | Yang | H04L 51/043 455/63.4 |
| 2014/0126408 A1 | 5/2014 | Ding et al. | |
| 2014/0241240 A1* | 8/2014 | Kloper | H04W 16/28 370/328 |
| 2014/0355564 A1 | 12/2014 | Cherian et al. | |
| 2015/0078299 A1 | 3/2015 | Barriac et al. | |
| 2015/0288427 A1* | 10/2015 | Wang | H04W 72/1273 370/329 |
| 2015/0288428 A1* | 10/2015 | Choi | H04B 7/024 370/329 |
| 2016/0066198 A1* | 3/2016 | Wang | H04W 16/28 370/338 |

FOREIGN PATENT DOCUMENTS

| | | |
|---|---|---|
| WO | 2014029368 A1 | 2/2014 |
| WO | 2014066785 A1 | 5/2014 |
| WO | 2014074919 A1 | 5/2014 |

OTHER PUBLICATIONS

International Search Report received in Application No. PCT/CN2015/084367, mailed Sep. 29, 2015, 11 pages.

* cited by examiner

SYSTEM AND METHOD FOR COORDINATED BEAMFORMING FOR OVERLAPPING BASIC SERVICE SET IN WLAN

TECHNICAL FIELD

The present invention relates to network communications, and, in particular embodiments, to a system and method for coordinated beamforming for overlapping basic service set in WLAN.

BACKGROUND

Wireless Local Area Networks (WLANs) commonly operate in unlicensed spectrum bands. Rules for operation in these bands force competing devices to share the available resources and defer their intended transmissions when the medium is sensed busy. Typically, a WLAN uses an Orthogonal Frequency-Division Multiplexing (OFDM) transmission format in which all transmission resources are assigned to a single device. Random assignment is commonly achieved using carrier sense multiple access with collision avoidance (CSMA/CA). With CSMA/CA a device wins access to the medium, transmits its data up to a pre-defined period of time, and then gives up the medium for other devices to compete for transmission. Coordinated Beamforming is a mechanism that is used typically in cellular communication systems, by which a number of wireless devices in the interference range of each other are able to transmit their information to different destinations simultaneously. Simultaneous transmissions are made possible by using beamforming to eliminate or reduce the interference to acceptable levels. There is a need for a system and methods to efficiently implement beamforming in WLAN scenarios including overlapping basic service sets.

SUMMARY OF THE INVENTION

In accordance with an embodiment, a method by an access point (AP) enabling coordinated beamforming (CB) for overlapping basic service sets (OBSSs) in wireless local area network (WLAN) includes sending by the AP a Feedback Request (FBR) frame to each one of a plurality of stations (STAs). The OBSSs comprise the STAs and a plurality of APs including the AP. The method further includes receiving a feedback frame from each STA of the STAs that participate in CB transmission for the OBSSs. The feedback frame includes channel state information (CSI) of the STA, the CSI enabling the sending AP of performing CB on downlink.

In accordance with another embodiment, an AP enabling CB for OBSSs in WLAN comprises a processor and a non-transitory computer readable storage medium storing programming for execution by the processor. The programming includes instructions to send a FBR frame to each one of a plurality of STAs. The OBSSs comprise the STAs and a plurality of APs including the AP. The programming includes further instructions to receive a feedback frame from each STA of the STAs that participate in CB transmission for the OBSSs. The feedback frame includes CSI of the STA. The CSI enables the sending AP of performing CB on downlink.

In accordance with another embodiment, a method by an AP enabling CB for OBSSs in WLAN includes receiving by the AP an initiate CB frame from a second AP initiating in CB transmission for OBSSs, wherein the OBSSs comprise a plurality of APs and a plurality of STAs associated with the APs. The method further includes sending an acknowledgement (ACK) frame to the second AP, wherein the AP participates in the CB transmission with the second AP. The AP then sends a FBR frame to each one of the STAs, and receives a feedback frame from each STA of the STAs that participate in the CB transmission. The feedback frame includes CSI of the STA, wherein the CSI enables the receiving AP of performing CB on downlink. The AP then starts the CB transmission with each one of the other APs participating in the CB transmission.

In accordance with another embodiment, an AP enabling CB for OBSSs in WLAN comprise a processor and a non-transitory computer readable storage medium storing programming for execution by the processor. The programming includes instructions to receive an initiate CB frame from a second AP initiating in CB transmission for OBSSs, wherein the OBSSs comprise a plurality of APs and a plurality of STAs associated with the APs. The programming further includes instructions to send an ACK frame to the second AP, wherein the AP participates in the CB transmission with the second AP. The instructions further enable the AP to send a FBR frame to each one of the STAs, and receive a feedback frame from each STA of the STAs that participate in the CB transmission. The feedback frame includes CSI of the STA, wherein the CSI enables the receiving AP of performing CB on downlink. The instructions enable the AP to start the CB transmission with each one of the other APs participating in the CB transmission.

In accordance with another embodiment, a method by a STA in OBSSs in WLAN includes receiving from an AP a FBR frame, wherein the OBSSs comprise a plurality of APs including the AP and further comprise a plurality of stations (STAs) including the STA. The method further includes sending a feedback frame to the AP, wherein the STA participates in the CB transmission with the AP. The feedback frame includes CSI of the STA. The CSI enables the sending AP of performing CB on downlink.

In accordance with yet another embodiment, a STA in OBSSs in WLAN comprises a processor and a non-transitory computer readable storage medium storing programming for execution by the processor. The programming includes instructions to receive from an AP a FBR frame. The OBSSs comprise a plurality of APs including the AP and further comprise a plurality of STAs including the STA. The programming includes further instructions to send a feedback frame to the AP, wherein the STA participates in the CB transmission with the AP. The feedback frame includes CSI of the STA. The CSI enables the sending AP of performing CB on downlink.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
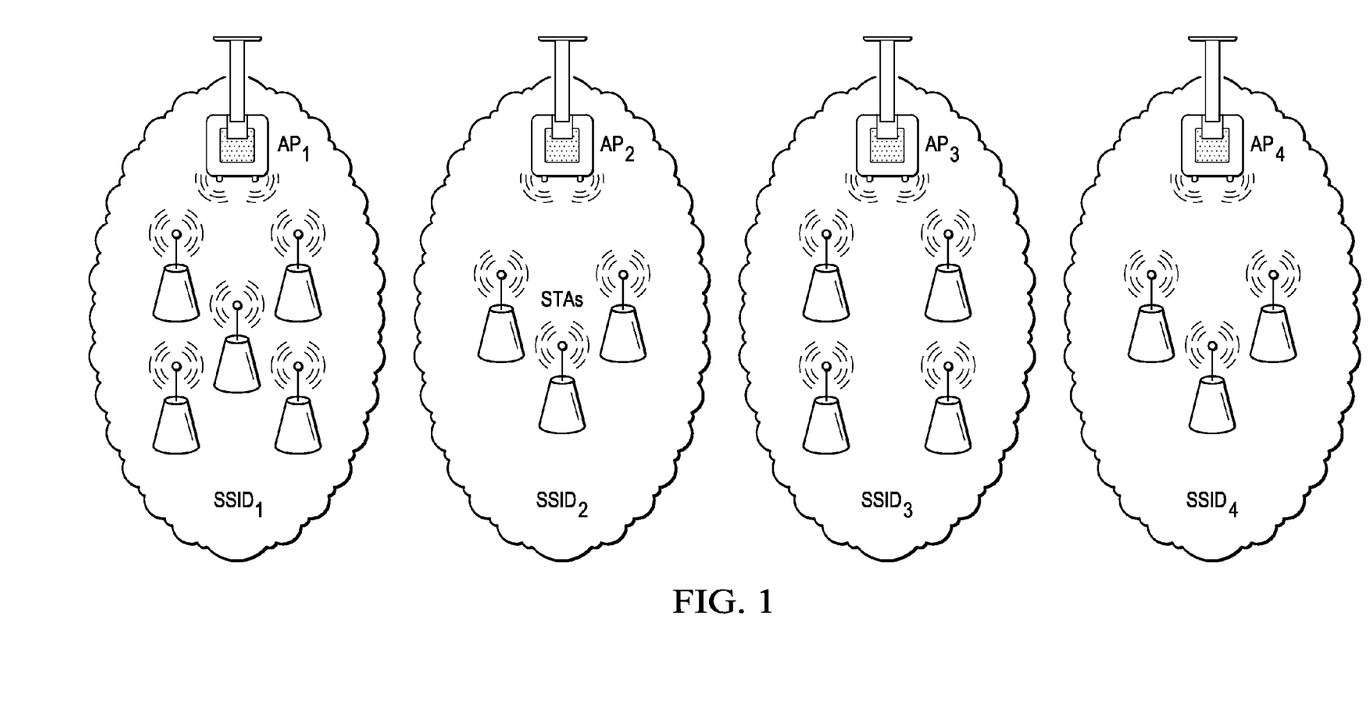
FIG. 1 is a diagram illustrating a scenario of overlapping basic service sets (OBSSs)

FIG. 1 shows an example of a plurality of basic service sets (BSSs) corresponding to a WLAN. Alternatively, the sets may correspond to multiple WLANs. The BSSs are identified by corresponding service set IDs (labeled SSID1 to SSID4 in the figure). Each BSS includes a corresponding access point (AP) and one or more stations (STAs) associated with the AP. The AP is any communication device, such as a wireless modem or router, allowing the STAs to access and communicate with the WLAN. The STAs are any user communication devices allowing users or subscribers to communicate with the AP and hence the WLAN. Examples of STAs include smartphones, tablet computers, laptop computers, desktop computers, sensor devices (e.g., smartwatch), and other mobile or communication devices with WLAN (e.g., WiFi) capability.

The BSSs may be relatively close to each other in a limited geographical area. For example, the BSSs may belong to different apartments in an apartment building, or they may belong to different establishments in a commercial district. Such sets are referred to herein as overlapping BSSs (OBSSs). Due to the proximity of the BSSs, the signals from the devices in different sets can experience significant interference which affects the quality of communications.

Disclosed herein are system and method embodiments for enabling a coordinated beamforming mechanism in WLAN scenarios to overcome the interference issue, such as in the case of multiple relatively close BSSs. Using coordinated beamforming, the communications in the different sets can be adjusted (e.g., via adjusting beam directions, orientation and parameters) to reduce the interference of the signals corresponding to different sets. For instance, the beamforming mechanism can be similar to the beamforming used in cellular communications systems.

In a typical WLAN OBSS environment, a single device is allowed to transmit at any point in time using carrier sense multiple access with collision avoidance (CSMA/CA). As such, all other devices defer their transmissions to avoid interference. This behavior severely limits area throughput. Area throughput can be improved by using coordinated beamforming to eliminate or reduce the interference between devices and allowing multiple devices to simultaneously transmit at the same time.

Figure 2:
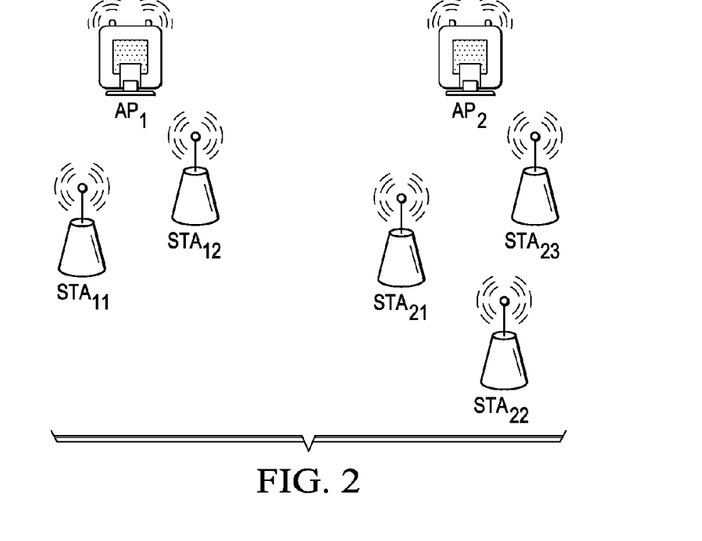
FIG. 2 is a diagram illustrating a coordinated beamforming scenario.

The embodiments herein enable coordinated beamforming to allow the simultaneous transmission from a number of adjacent APs, where each AP can transmit to one or more of the STAs associated with it. This is referred to herein as downlink (DL) coordinated beamforming. The beamforming requires channel state information (CSI) to be exchanged between all participating devices. FIG. 2 shows an example of a coordinated beamforming scenario. The scenario includes two APs located in proximity of each other to form a WLAN OBSS. Two STAs ($STA_{11}$ and $STA_{12}$) are associated with a first AP ($AP_1$), and three other STAs ($STA_{21}$, $STA_{22}$, and $STA_{23}$) are associated with the second AP ($AP_2$). For DL coordinated beamforming, each AP needs to collect CSI information from all the five STAs. To achieve this, each AP can start the CSI feedback process at any time as appropriate.

Figure 3:
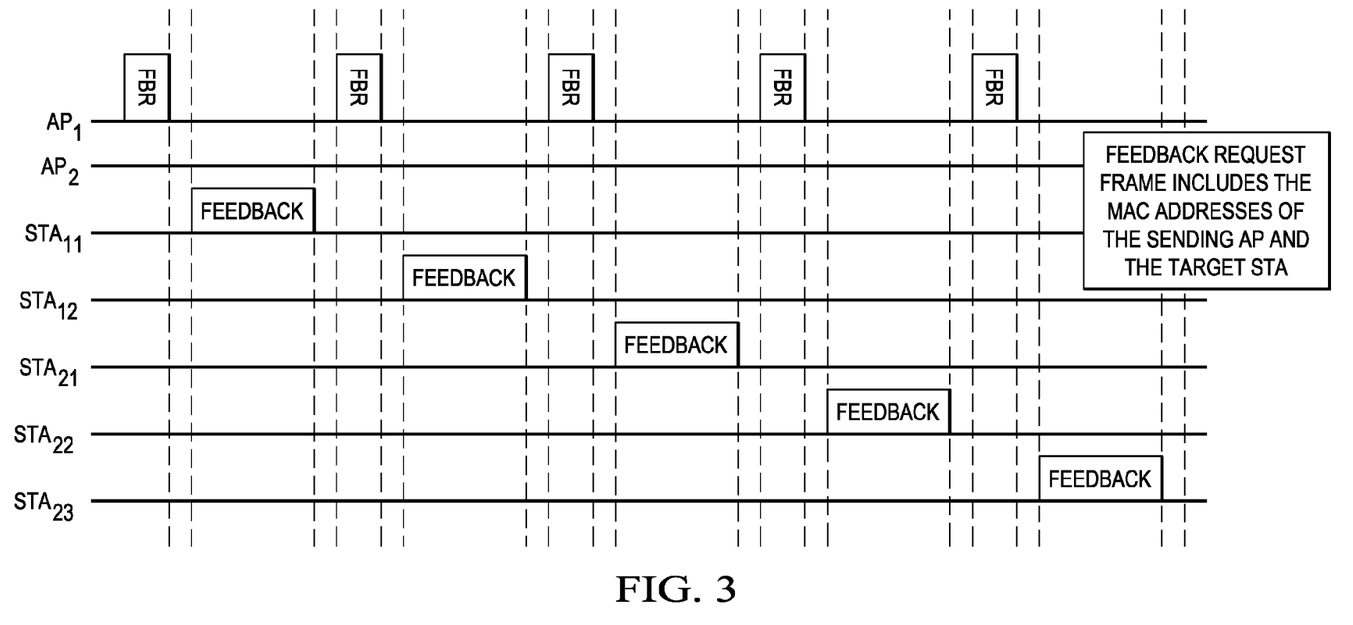
FIG. 3 is a flow diagram illustrating an embodiment of a CSI Feedback Process initiated by an access point (AP)

FIG. 3 shows an embodiment of a CSI feedback process initiated by one of the APs, e.g., $AP_1$. The process starts by $AP_1$ sending Feedback Request (FBR) frames to each one of the STAs participating in the coordinated beamforming transmission, one FBR frame at a time. For instance, the process may be started by $AP_1$ upon a decision to participate in CB transmission for OBSSs comprising a plurality of APs and a plurality of STAs associated with the APs. Each one of the FBR frames indicates the Media Access Control (MAC) addresses of the sending AP and the target STA. The reception of the FBR by a target STA triggers the target STA to estimate the channel between itself and the transmitting AP. The CSI can then be transmitted from the STA to the AP using a Feedback frame. The AP may send FBR frames to the participating STAs in any order. The AP may receive the Feedback frames from the participating STAs in the same order of the transmitted FBR frames as shown in FIG. 3. The feedback frame from the STA indicates that the STA is participating in the CB transmission. If no feedback frame is received from a STA, then $AP_1$ excludes this STA from the CB transmission. This means that the STA that does not send a feedback frame is not considered to be a participating STA. Thus, the STA is discarded (by the participating AP) from the CB transmission.

Figure 4:
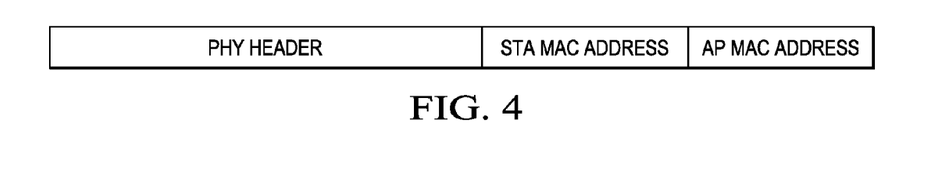
FIG. 4 illustrates an embodiment of a feedback request frame format.

FIG. 4 shows an embodiment of a FBR frame. The FBR frame includes a Physical Layer (PHY) header and a MAC header. The PHY header includes an indication field and sufficient training fields for estimating channel information by the STA. The MAC header, e.g., a 12 bytes field, includes the MAC address of the target STA and the MAC address of the transmitting AP.

Figure 5:
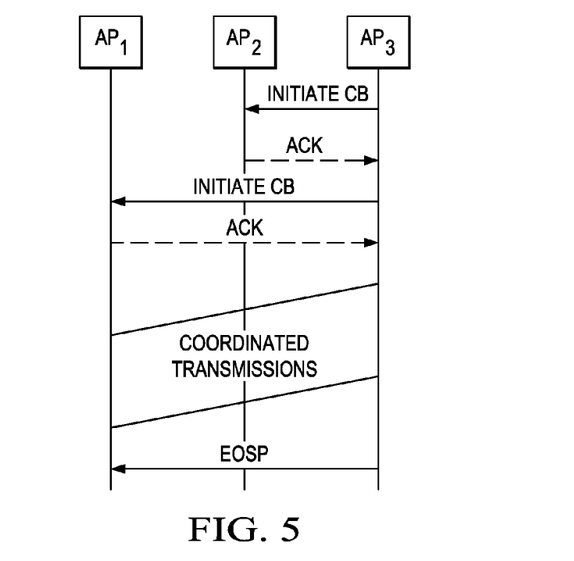
FIG. 5 is a flow diagram illustrating an embodiment of an initiation of coordinated transmission by a lead AP.

After the exchange described above of FBR frames and Feedback frames between the APs and the STAs, coordinated beamforming (CB) data exchange can be started when a participating AP gains access to the wireless medium. For instance, the winning AP (the AP that gains the medium) is designated as the leading AP for the subsequent data exchange. The leading AP initiates the CB data transmissions by sending initiation frames to the other participating APs in the OBSS. FIG. 5 shows an embodiment of an exchange of the initiation frames and data assuming that $AP_3$ is the leading AP. $AP_3$ initiates the coordinated transmissions by sending initiate CB frames to both $AP_1$ and $AP_2$. $AP_1$ and $AP_2$ need to acknowledge the reception of the initiate CB frame to indicate their intention to participate in the coordinated transmissions. The ACK frame from the AP indicates that the AP is participating in the CB transmission. If no acknowledgement (ACK) frame is received back from an AP, it is an indication that the AP has declined the invitation. This means that the AP that does not send an ACK frame is not considered to be a participating AP. Thus, the AP is discarded (by the leading AP) from the CB transmission. Coordinated transmissions from participating APs can then start, which comprises the exchange of data and acknowledgement frames takes place. The leading AP ($AP_3$ in this scenario) can terminate the coordinated transmissions by sending an end of service period (EOSP) frame to all participating APs. The EOSP can be broadcasted or sent to each AP.

Figure 6:
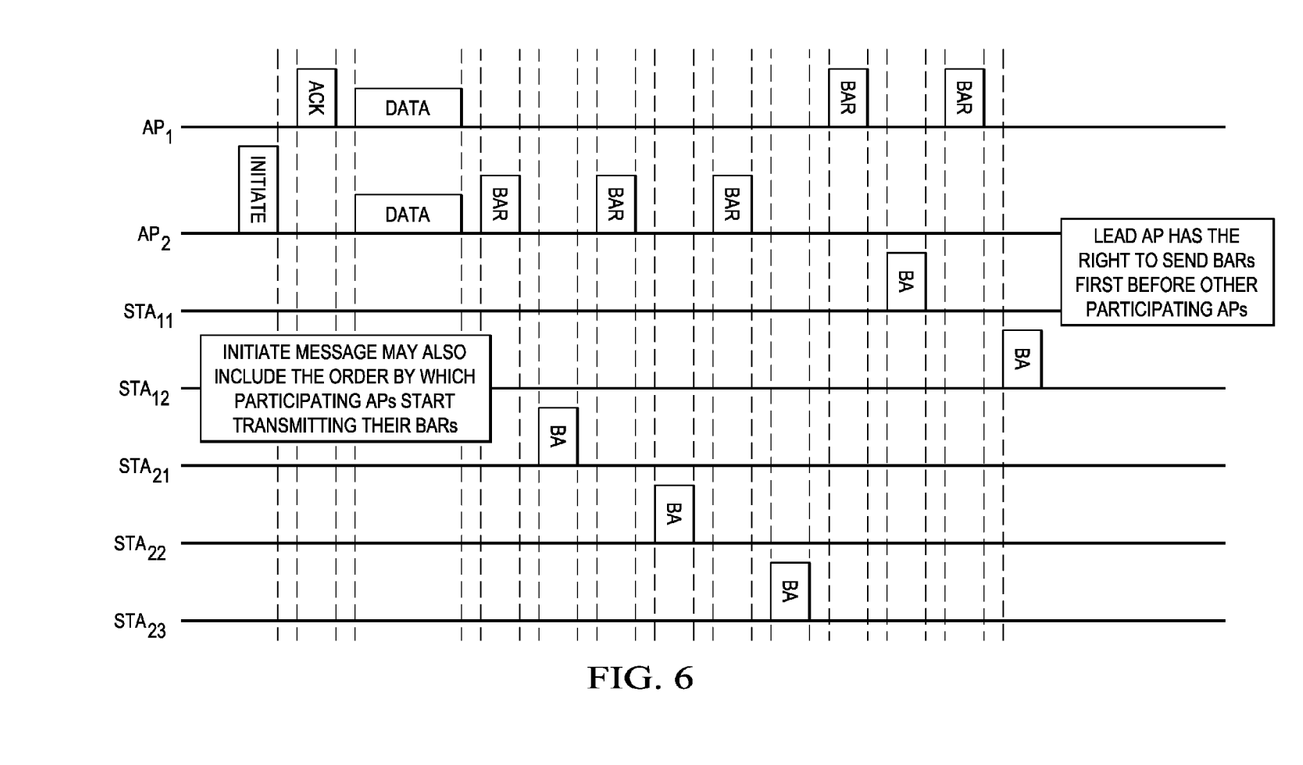
FIG. 6 is a flow diagram illustrating an embodiment of a coordinated feedback data sequence.

FIG. 6 shows an embodiment of a coordinated feedback data sequence. The data sequence includes an exchange of data and ACK frames between an AP and a STA, as described below. In this scenario, $AP_2$ is the lead AP which sends an initiate CB frame to $AP_1$. After $AP_1$ acknowledges the initiate CB frame, data exchange starts, where each AP sends data. The data is sent by the APs simultaneously on DL using coordinated beamforming. The APs subsequently collect (or request) Block ACK (BA) frames by sending BA Request (BAR) frames to their corresponding STAs. The lead AP ($AP_2$) sends its BAR frames first to request the BA frames from its associated STAs. In one embodiment, the BAR frames are sent from the APs to the corresponding STAs consecutively in sequence (in time). It is possible that the BA frames are also sent back by the STAs in a corresponding sequence, as shown in the example of FIG. 6.

Figure 7:
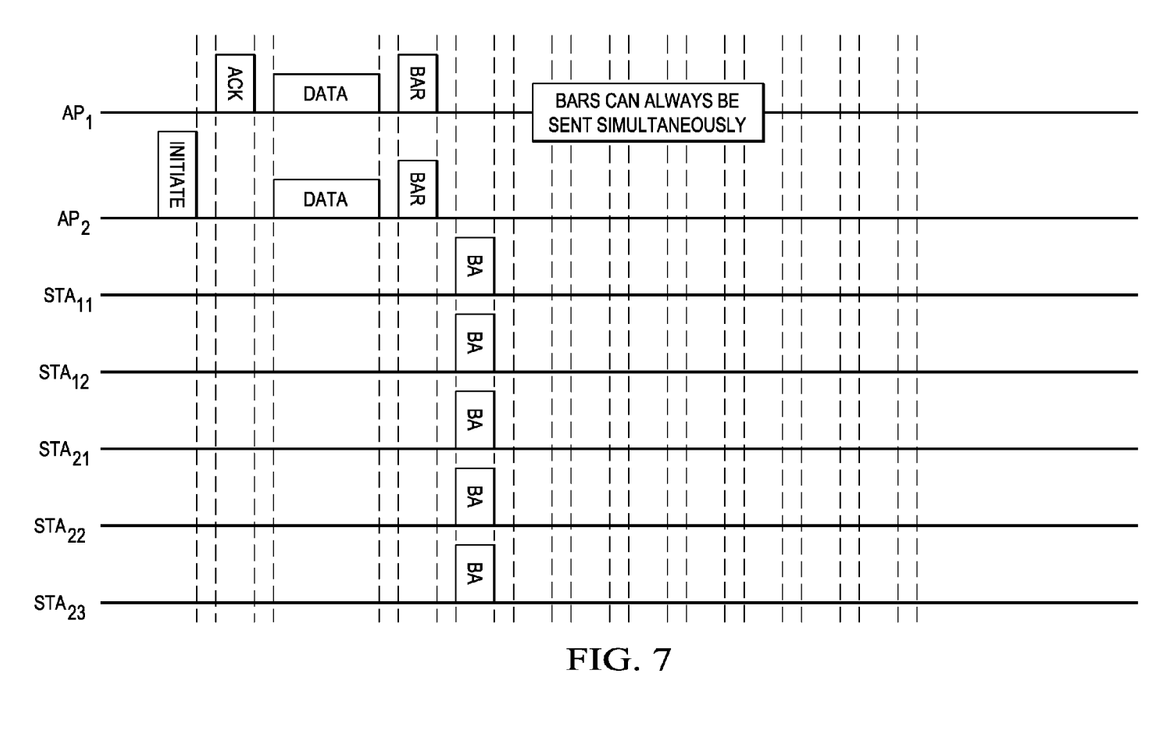
FIG. 7 is a flow diagram illustrating an embodiment of a data sequence using uplink coordinated beamforming.

FIG. 7 shows an embodiment of a data sequence using uplink (UL) coordinated beamforming. In this case, the participating APs send the data and the BAR frames on DL concurrently (simultaneously) using coordinated beamforming. If coordinated beamforming is also supported in the UL, then the STAs can respond to the BAR frames by sending their BA frames concurrently on the UL using the coordinated beamforming.

Figure 8:
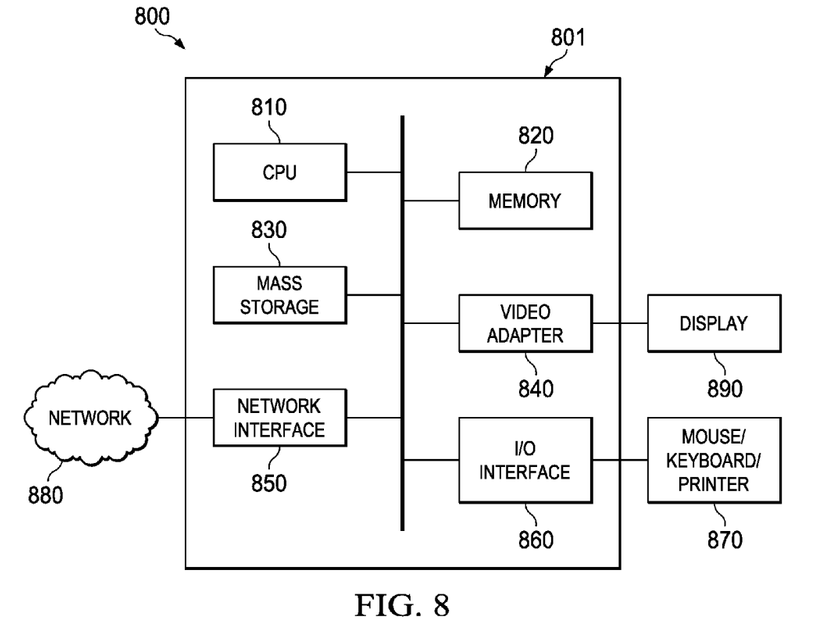
FIG. 8 is a diagram of a processing system that can be used to implement various embodiments.

FIG. 8 is a block diagram of a processing system 800 that can be used to implement various embodiments. For instance the processing system 800 can be part of an AP, a STA, or an access controller (AC) in a WLAN. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 800 may comprise a processing unit 801 equipped with one or more input/output devices, such as a speaker, microphone, mouse, touchscreen, keypad, keyboard, printer, display, and the like. The processing unit 801 may include a central processing unit (CPU) 810, a memory 820, a mass storage device 830, a video adapter 840, and an I/O interface 860 connected to a bus. The bus may be one or more of any type of several bus architectures including a memory bus or memory controller, a peripheral bus, a video bus, or the like.

The CPU 810 may comprise any type of electronic data processor. The memory 820 may comprise any type of system memory such as static random access memory (SRAM), dynamic random access memory (DRAM), synchronous DRAM (SDRAM), read-only memory (ROM), a combination thereof, or the like. In an embodiment, the memory 820 may include ROM for use at boot-up, and DRAM for program and data storage for use while executing programs. In embodiments, the memory 820 is non-transitory. The mass storage device 830 may comprise any type of storage device configured to store data, programs, and other information and to make the data, programs, and other information accessible via the bus. The mass storage device 830 may comprise, for example, one or more of a solid state drive, hard disk drive, a magnetic disk drive, an optical disk drive, or the like.

The video adapter 840 and the I/O interface 860 provide interfaces to couple external input and output devices to the processing unit. As illustrated, examples of input and output devices include a display 890 coupled to the video adapter 840 and any combination of mouse/keyboard/printer 870 coupled to the I/O interface 860. Other devices may be coupled to the processing unit 801, and additional or fewer interface cards may be utilized. For example, a serial interface card (not shown) may be used to provide a serial interface for a printer.

The processing unit 801 also includes one or more network interfaces 850, which may comprise wired links, such as an Ethernet cable or the like, and/or wireless links to access nodes or one or more networks 880. The network interface 850 allows the processing unit 801 to communicate with remote units via the networks 880. For example, the network interface 850 may provide wireless communication via one or more transmitters/transmit antennas and one or more receivers/receive antennas. In an embodiment, the processing unit 801 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method by a first access point (AP) enabling coordinated beamforming (CB) for overlapping basic service sets (OBSSs) in wireless local area network (WLAN), the method comprising:
   sending by the first AP a Feedback Request (FBR) frame to each one of a plurality of stations (STAs), wherein the OBSSs comprise the STAs and a plurality of APs including the first AP and other APs;
   receiving a feedback frame from each STA of the STAs that participate in CB transmission for the OBSSs, wherein the feedback frame includes channel state information (CSI) of the STA, and wherein at least one of the STAs that participate in the CB transmission for the OBSSs is associated with one of the other APs and not with the first AP, the CSI enabling the first AP to perform CB on downlink;

sending an initiate CB frame to each one of the other APs in the OBSSs;

receiving an acknowledgement (ACK) frame from each one of the other APs intending to participate in the CB transmission;

starting the CB transmission with each one of the other APs that participate in the CB transmission; and sending an end of service period (EOSP) frame terminating the CB transmission.

2. The method of claim 1, wherein the EOSP frame is sent to each one of the other APs participating in the CB transmission.

3. The method of claim 1, further comprising discarding in the CB transmission each one of the other APs of which no ACK frame was received.

4. The method of claim 1, further comprising:
upon starting the CB transmission, gaining access to a wireless medium for sending frames in the OBSSs;
sending, with the other APs participating in the CB transmission, data on downlink to the STAs participating in the CB transmission, wherein the data is sent using CB with the other APs participating in the CB transmission;
sending a Block ACK Request (BAR) frame to each STA associated with the first AP; and
receiving a Block ACK (BA) frame from each STA associated with the first AP.

5. The method of claim 4, wherein the BAR frame is sent to each STA associated with the first AP consecutively in sequence.

6. The method of claim 4, wherein the BAR frame is sent to each STA associated with the first AP concurrently using CB on downlink, and wherein the BA frame is received from each STA associated with the first AP concurrently via CB on uplink.

7. The method of claim 1, further comprising discarding in the CB transmission each one of other STAs from which no feedback frame was received.

8. The method of claim 1, wherein the FBR frame to each one of the STAs indicates Media Access Control (MAC) addresses of the first AP and a target STA.

9. The method of claim 1, wherein the FBR frame is sent to each one of the STAs consecutively in sequence.

10. A first access point (AP) enabling coordinated beamforming (CB) for overlapping basic service sets (OBSSs) in wireless local area network (WLAN), the first AP comprising:
a processor; and
a non-transitory computer readable storage medium storing programming for execution by the processor, the programming including instructions to:
send a Feedback Request (FBR) frame to each one of a plurality of statins (STAs), wherein the OBSSs comprise the STAs and a plurality of APs including the first AP and other APs;
receive a feedback frame from each STA of the STAs that participate in CB transmission for the OBSSs, wherein the feedback frame includes channel state information (CSI) of the STA, and wherein at least one of the STAs that participate in the CB transmission for the OBSSs is associated with one of the other APs and not with the first AP, the CSI enabling the first AP to perform CB on downlink;
send an initiate CB frame to each one of the other APs in the OBSSs;
receive an acknowledgement (ACK) frame from each one of the other APs that participate in the CB transmission;
start the CB transmission with each one of the other APs that participate in the CB transmission; and
send, to the other APs participating in the CB transmission, an end of service period (EOSP) frame terminating the CB transmission.

11. The first AP of claim 10, wherein the programming includes further instructions to:
upon starting the CB transmission, gain access to a wireless medium for sending frames in the OBSSs;
send, with the other APs participating in the CB transmission, data on downlink to the STAs participating in the CB transmission, wherein the data is sent using CB with the other APs participating in the CB transmission;
send a Block ACK Request (BAR) frame to each STA associated with the first AP; and
receive a Block ACK (BA) frame from each STA associated with the first AP.

12. The first AP of claim 10, wherein the FBR frame to each one of the STAs indicates Media Access Control (MAC) addresses of the first AP and a target STA.

13. A method by a first access point (AP) enabling coordinated beamforming (CB) for overlapping basic service sets (OBSSs) in wireless local area network (WLAN), the method comprising:
receiving by the first AP an initiate CB frame from a second AP initiating CB transmission for OBSSs, wherein the OBSSs comprise a plurality of APs and a plurality of stations (STAs) associated with the APs, and wherein the plurality of APs includes the first AP, the second AP and other APs;
sending an acknowledgement (ACK) frame to the second AP, wherein the first AP participates in the CB transmission with the second AP;
sending a Feedback Request (FBR) frame to each one of the STAs;
receiving a feedback frame from each STA of the STAs that participate in the CB transmission, wherein the feedback frame includes channel state information (CSI) of the STA, and wherein at least one of the STAs that participate in the CB transmission is associated with the second AP or one of the other APs, and not with the first AP, the CSI enabling the first AP to perform CB on downlink;
starting the CB transmission with each one of the other APs participating in the CB transmission; and
receiving, from the second AP, an end of service period (EOSP) frame terminating the CB transmission.

14. The method of claim 13, further comprising:
sending, with the other APs participating in the CB transmission, data on downlink to the STAs participating in the CB transmission, wherein the data is sent using CB with the other APs participating in the CB transmission;
sending a Block ACK Request (BAR) frame to each STA associated with the first AP; and
receiving a Block ACK (BA) frame from each STA associated with the first AP.

15. The method of claim 13, wherein the FBR frame to each one of the STAs indicates Media Access Control (MAC) addresses of the first AP and a target STA.

16. A first access point (AP) enabling coordinated beamforming (CB) for overlapping basic service sets (OBSSs) in wireless local area network (WLAN), the first AP comprising:
- a processor; and
- a non-transitory computer readable storage medium storing programming for execution by the processor, the programming including instructions to:
  - receive an initiate CB frame from a second AP initiating in CB transmission for OBSSs, wherein the OBSSs comprise a plurality of APs and a plurality of stations (STAs) associated with the APs, and wherein the plurality of APs includes the first AP, the second AP and other APs;
  - send an acknowledgement (ACK) frame to the second AP, wherein the first AP participates in the CB transmission with the second AP;
  - send a Feedback Request (FBR) frame to each one of the STAs;
  - receive a feedback frame from each STA of the STAs that participate in the CB transmission, wherein the feedback frame includes channel state information (CSI) of the STA, and wherein at least one of the STAs that participate in the CB transmission is associated with the second AP or one of the other APs, and not with the first AP, the CSI enabling the first AP to perform CB on downlink;
  - start the CB transmission with each one of the other APs participating in the CB transmission; and
  - receive, from the second AP, an end of service period (EOSP) frame terminating the CB transmission.

17. The first AP of claim 16, wherein the programming includes further instructions to:
- send, with the other APs participating in the CB transmission, data on downlink to the STAs participating in the CB transmission, wherein the data is sent using CB with the other APs participating in the CB transmission;
- send a Block ACK Request (BAR) frame to each STA associated with the first AP;
- receive a Block ACK (BA) frame from each STA associated with the first AP; and
- receiving, from the second AP, an end of service period (EOSP) frame terminating the CB transmission.

18. A method by a station (STA) in overlapping basic service sets (OBSSs) in wireless local area network (WLAN), the method comprising:
- receiving from a first access point (AP) a Feedback Request (FBR) frame, wherein the OBSSs comprise a plurality of APs including the first AP and other APs, and further comprise a plurality of stations (STAs) including the STA;
- sending a feedback frame to the first AP, wherein the STA participates in a coordinated beamforming (CB) transmission with the first AP, wherein the STA is associated with one of the other APs and not with the first AP, and wherein the feedback frame includes channel state information (CSI) of the STA, the CSI enabling the first AP to perform CB on downlink;
- starting the CB transmission with the first AP and each one of the other APs participating in the CB transmission, after the first AP sends an initiate CB frame to each one of the other APs in the OBSSs, and after each one of the other APs intending to participate in the CB transmission sends an acknowledgement (ACK) frame; and
- ending the CB transmission after the first AP sends an end of service period (EOSP) frame.

19. The method of claim 18, further comprising:
- receiving data from the first AP, wherein the data is sent by the first AP using CB with the other APs participating in the CB transmission;
- receiving a Block Acknowledgment (ACK) Request (BAR) frame from the first AP; and
- sending a Block ACK (BA) frame to the first AP.

20. The method of claim 19, wherein the BA frame is sent to the first AP concurrently with other STAs associated with the first AP via CB on uplink.

21. A station (STA) in overlapping basic service sets (OBSSs) in wireless local area network (WLAN), the STA comprising:
- a processor; and
- a non-transitory computer readable storage medium storing programming for execution by the processor, the programming including instructions to:
  - receive from a first access point (AP) a Feedback Request (FBR) frame, wherein the OBSSs comprise a plurality of APs including the first AP and other APs, and further comprise a plurality of stations (STAs) including the STA;
  - send a feedback frame to the first AP, wherein the STA participates in a coordinated beamforming (CB) transmission with the first AP, wherein the STA is associated with one of the other APs and not with the first AP, and wherein the feedback frame includes channel state information (CSI) of the STA, the CSI enabling the first AP to perform CB on downlink;
  - start the CB transmission with the first AP and each one of the other APs participating in the CB transmission, after the first AP sends an initiate CB frame to each one of the other APs in the OBSSs, and after each one of the other APs intending to participate in the CB transmission sends an acknowledgement (ACK) frame; and
  - end the CB transmission after the first AP sends an end of service period (EOSP) frame.

22. The STA of claim 21, wherein the programming includes further instructions to:
- receive data from the first AP, wherein the data is sent by the first AP using CB with the other APs participating in the CB transmission;
- receive a Block Acknowledgement (ACK) Request (BAR) frame from the first AP; and
- send a Block ACK (BA) frame to the first AP.

* * * * *

UNITED STATES PATENT AND TRADEMARK OFFICE
CERTIFICATE OF CORRECTION

PATENT NO. : 9,503,911 B2
APPLICATION NO. : 14/340175
DATED : November 22, 2016
INVENTOR(S) : Osama Aboul-Magd et al.

It is certified that error appears in the above-identified patent and that said Letters Patent is hereby corrected as shown below:

In the Claims

In Column 9, Line 39, Claim 17, delete "first AP;" and insert --first AP; and--.

In Column 9, Line 41, Claim 17, delete "AP; and" and insert --AP.--.

In Column 9, delete Lines 42 and 43.

Signed and Sealed this
Seventh Day of March, 2017

Michelle K. Lee
*Director of the United States Patent and Trademark Office*